June 28, 1927.

M. S. WILLIAMS 1,633,801

ELECTRICAL HEATING APPLIANCE

Filed June 9, 1925

INVENTOR.
Maude S. Williams
BY
Fitzenberg
ATTORNEY.

Patented June 28, 1927.

1,633,801

UNITED STATES PATENT OFFICE.

MAUDE S. WILLIAMS, OF LOS ANGELES, CALIFORNIA.

ELECTRICAL HEATING APPLIANCE.

Application filed June 9, 1925. Serial No. 35,911.

My invention relates to electrical heating appliances which can be readily attached to a fan frame for heating air forced therethrough, with means for multiplying the number of heating units which can be attached and supported on the fan frame, said heating units being adapted to be used for heating articles set thereon, when said heating units are placed upon a suitable stand therefor, thus making it possible to quickly, conveniently and economically convert said heating elements from one use to another and making them capable of serving for many different purposes.

In order to explain my invention, I have shown one practical embodiment thereof on the accompanying sheet of drawings which I will now describe. In the drawings,—

Figure 3:
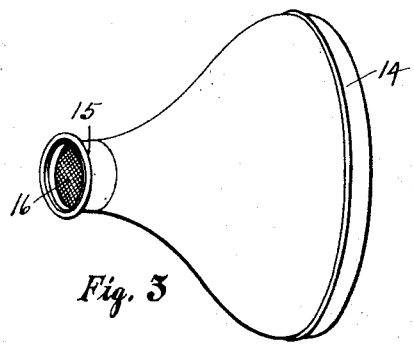
Figure 3 shows an attachment which can be used in connection with the heater when applied to a fan for reducing the current of heated air to a smaller and more direct area.

Referring now more in detail to the drawings, my invention as here embodied for illustrative purposes, comprises a main heating element 1, which includes the cylindrical body, designated by the reference numeral 1, the heating element, 2 and the guard screen 3, together with a cord, 4, for connecting said heating element with a source of electric energy. A secondary heating element comprises a band, 5, having the reduced portion, 6, adapted to telescope into the body 1, the heating elements, 7, and the cord, 8. A combination grate and guard comprising the outer ring member, 9, with the annular shoulder, 10, adapted to fit into the band 5, or into the body 1, with the cross bars, 11, is also provided and this can be used to support articles above the heating elements, or as a guard in front of the heating element when attached to a fan, as shown in Fig. 1.

Figure 2:
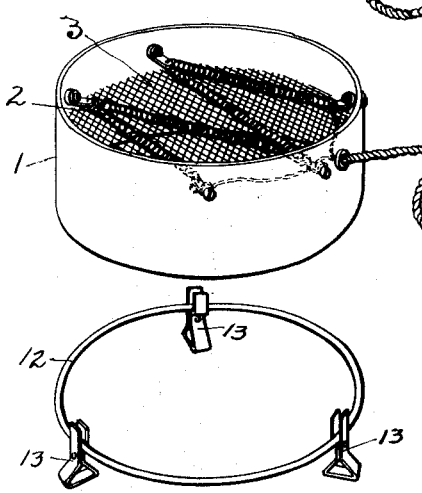
Figure 2 shows four parts which are capable of being brought together in interfitting relationship with each other, but separated in order to show their construction, said parts, when brought together constituting a heating appliance on which articles can be set.

When used as a heating element, or cooker, I have provided a support, or base, comprising the ring member, 12, with the supporting elements, 13, 13, three of which are shown holding the ring, 12, and providing three pairs of upwardly projecting parts in which the lower edge of said cylindrical body 1, is set, as will be clear from the showing in Fig. 2.

Figure 1:
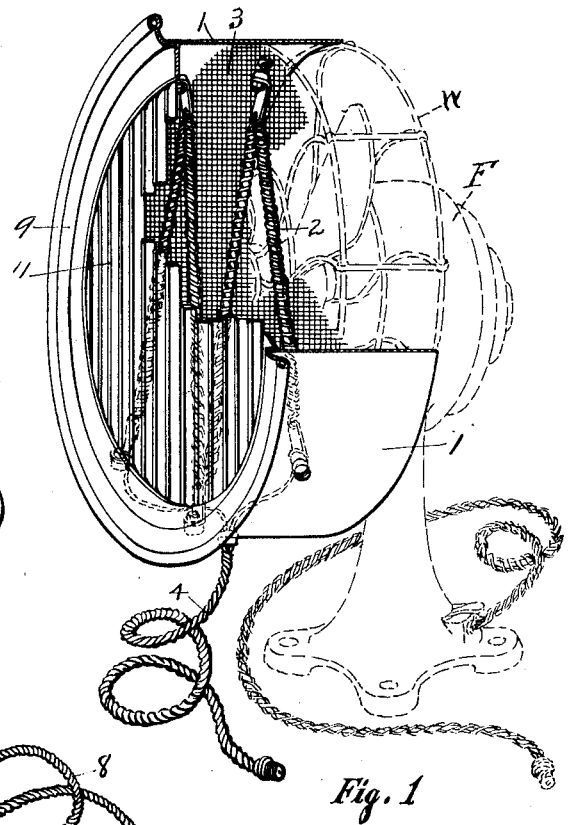
Figure 1 is a perspective view of a fan with my invention applied thereto and with parts broken away.

In Fig. 1, I have shown a standard electric fan in broken lines, designated F, with the usual wire frame, W, and over this frame my cylindrical body, 1, is adapted to fit, substantially in the manner indicated, with the guard wire or screen 3, in front of the fan, between the heating elements 2, and the grate 9. If it is desired to have more heated air from the fan, the secondary heating element can be interposed readily between the body 1, and the grate 9, as will be readily understood from the drawings.

When it is desired to concentrate the heat from the fan, I have provided a funnel like member, Fig. 3, which can be substituted for the grade member 9, one end thereof, 14, fitting into the body member 1, and the reduced end, 15, being provided with a small guard screen, 16, as shown. This is readily attached and removed, as desired.

Figure 4:
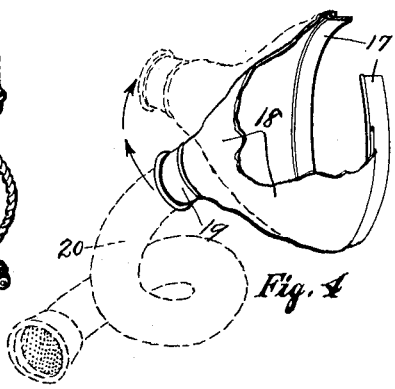
Figure 4 is a similar device of fabric, with a short discharge hose thereon.

In Fig. 4, I have shown a similar funnel like member having the attaching ring, 17, and a conical body, 18, of suitable fabric, with a reduced end, 19, adapted to have attached thereto a distributing hose member, 20, for such use as may be found advantageous.

Thus I have provided a simple, practical and efficient electrical heating appliance which can be used with a fan to give various degree of heat by using one or more heating units, or which can be as readily and efficiently used as a cooker or heater upon which articles can be set, as when the parts shown in Fig. 2 are brought together in assembled form, which will be readily understood. The parts can be assembled or taken apart without the necessity of tools or other devices, as all parts are made to interfit in the manner indicated, and while I have shown and described but one form or embodiment of my invention, I do not limit the invention to the showing made, except as I may be limited by the hereto appended claims.

I claim:

1. An electrical heating appliance comprising in combination a cylindrical member open at both ends, a heating element therein, both ends of said cylindrical member being adapted to receive other elements, a secondary unit comprising a ring member having heating means therein and adapted to telescope with said cylindrical member, and a combination guard and grate element adapted to fit detachably said cylindrical member or said secondary ring member, substantially as shown and described.

2. An electrical heating appliance comprising in combination, a plurality of cylindrical members open at both ends and adapted to interfit with each other and each adapted to receive and hold other elements interfitting therewith, heating elements within said cylindrical members with means for connecting them to a source of electrical energy, a combination guard and grate member adapted to interfit with either of said cylindrical members, and a supporting member adapted to fit the edge of said cylindrical member and to hold the same, substantially as described.

3. An electrical heating appliance comprising a cylindrical member open at both ends and adapted at one end to have other elements telescoped therewith to be supported thereby and at its other end adapted to fit over and be supported by another article, heat developing means within said cylindrical member and adapted to be connected to a source of electrical energy, and a secondary cylindrical member, with heating means therein, adapted to telescope with said first mentioned cylindrical member and to be supported thereby, said secondary cylindrical member being adapted to receive and support other articles telescoped therewith, and a combination grate and guard adapted to interfit with either of said cylindrical members.

4. An electrical appliance including in combination, a body member open at both ends and adapted to have telescopic connection with other elements at either end, a heating element within said body, a secondary element adapted to telescope into said body element and also having a heating element therein, a combination guard and grate adapted to telescope into either said body or said secondary element, and a member having one end adapted to fit said body and reduced in diameter at its other end for converging and concentrating air currents passing therethrough.

5. An electrical appliance including a body member open at both ends and adapted at one end to telescope over a motor fan and at its other end adapted to have other elements telescoped detachably therewith, a heating element within said body, a combination guard and grate adapted to be telescoped with the outer end of said body, and an air concentrating member having one end adapted to telescope with said body and reduced in size at its other end for converging air currents, said guard and grate and said air concentrating member being interchangeable in said body.

Signed at Los Angeles, Los Angeles County, California, this 29th day of May, 1925.

MAUDE S. WILLIAMS.